United States Patent
Meda et al.

(10) Patent No.: US 12,434,543 B2
(45) Date of Patent: Oct. 7, 2025

(54) WINDOW, RECREATIONAL VEHICLE WITH THE WINDOW AND METHODS FOR MANUFACTURING AND OPERATING THE WINDOW

(71) Applicant: Dometic Sweden AB, Solna (SE)

(72) Inventors: Samuele Meda, Chichester (GB); Rickard Hederstierna, Hägersten (SE)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 17/636,490

(22) PCT Filed: Jul. 29, 2020

(86) PCT No.: PCT/EP2020/071352
§ 371 (c)(1),
(2) Date: Feb. 18, 2022

(87) PCT Pub. No.: WO2021/032424
PCT Pub. Date: Feb. 25, 2021

(65) Prior Publication Data
US 2022/0297512 A1    Sep. 22, 2022

(30) Foreign Application Priority Data
Aug. 21, 2019   (DE) .......................... 102019212527.1

(51) Int. Cl.
*B60J 1/00*   (2006.01)
*B60J 1/14*   (2006.01)
*E05B 63/00*  (2006.01)

(52) U.S. Cl.
CPC ............. *B60J 1/14* (2013.01); *E05B 63/0052* (2013.01)

(58) Field of Classification Search
CPC ....... E05F 15/53; E05F 15/611; E05F 15/616; E05F 15/622; E05C 3/04; E05C 3/043;
(Continued)

(56) References Cited

U.S. PATENT DOCUMENTS

| | | |
|---|---|---|
| 2,066,705 A | 1/1937 | Vazquez |
| D105,027 S | 6/1937 | Moravek |

(Continued)

FOREIGN PATENT DOCUMENTS

| | | |
|---|---|---|
| AT | 459777 T | 3/2010 |
| AT | 529599 T | 11/2011 |

(Continued)

OTHER PUBLICATIONS

Notice of Allowance Issued in U.S. Appl. No. 29/724,878 mailed on Jul. 6, 2022.
(Continued)

*Primary Examiner* — Steven O Douglas
(74) *Attorney, Agent, or Firm* — Dinsmore & Shohl LLP (57) ABSTRACT

A window, for a recreational vehicle, comprises a frame, a pane, which is attached to the frame so that it can pivot relative to the frame about a pivot axis between a closed position and an opened position, an actuating device mounted on the frame or on the pane, and at least one locking element configured to be movable between a released state and a locked state. The frame has at least one cavity, receiving at least one actuating device and/or locking element at least partially, when the actuating device is in the second state and/or when the locking element is in the locked state, respectively.

21 Claims, 5 Drawing Sheets

(58) Field of Classification Search
CPC .. E05C 3/045; E05C 9/00; E05C 9/008; B60J 1/14
USPC ............. 296/146.16, 156, 164; 49/395
See application file for complete search history.

(56) References Cited

U.S. PATENT DOCUMENTS

| | | | |
|---|---|---|---|
| 2,256,548 A | 9/1941 | Chaffee | |
| 2,767,979 A * | 10/1956 | Hummert | E05F 11/14 |
| | | | 49/250 |
| D206,530 S | 12/1966 | Zell | |
| 4,180,117 A | 12/1979 | Greer | |
| 4,392,329 A * | 7/1983 | Suzuki | E05C 17/32 |
| | | | 49/356 |
| 4,793,099 A * | 12/1988 | Friese | B60J 1/1861 |
| | | | 49/362 |
| 5,142,834 A | 9/1992 | Laclave et al. | |
| 5,581,943 A | 12/1996 | Deren et al. | |
| 5,735,089 A | 4/1998 | Smith et al. | |
| 5,787,643 A | 8/1998 | Schmuck | |
| 5,941,022 A | 8/1999 | Schmuck | |
| 6,006,473 A | 12/1999 | Mariel et al. | |
| 6,021,834 A | 2/2000 | Malott | |
| 6,021,835 A | 2/2000 | Malott | |
| 6,135,511 A * | 10/2000 | Smith | E05C 9/063 |
| | | | 292/156 |
| 6,263,627 B1 | 7/2001 | Schoenebach et al. | |
| 6,588,819 B1 * | 7/2003 | Block | B60J 7/106 |
| | | | 296/10 |
| 7,024,822 B2 * | 4/2006 | Scheer | E05D 5/0246 |
| | | | 296/216.02 |
| D554,031 S | 10/2007 | Eskandry | |
| D558,652 S | 1/2008 | Davis | |
| 8,091,948 B2 | 1/2012 | Smith et al. | |
| 8,322,091 B2 | 12/2012 | Smith et al. | |
| 8,327,603 B2 | 12/2012 | Smith | |
| 8,776,435 B2 | 7/2014 | Hulst | |
| D735,628 S | 8/2015 | Eskandry | |
| D741,084 S | 10/2015 | Stankus | |
| D743,183 S | 11/2015 | Nye | |
| D756,868 S | 5/2016 | Shu | |
| D767,304 S | 9/2016 | Nye | |
| 9,499,030 B1 | 11/2016 | Gong | |
| D791,656 S | 7/2017 | Nguyen | |
| D793,308 S | 8/2017 | Lewis | |
| D801,244 S | 10/2017 | Shu | |
| D809,159 S | 1/2018 | Alexander | |
| D813,767 S | 3/2018 | Mulokandov | |
| 10,683,038 B2 | 6/2020 | Fleckenstein et al. | |
| D895,494 S | 9/2020 | BerTrand | |
| 10,814,763 B2 | 10/2020 | Cramer et al. | |
| D904,949 S | 12/2020 | Rago | |
| D910,515 S | 2/2021 | Patel | |
| D920,198 S | 5/2021 | Jia et al. | |
| D941,202 S | 1/2022 | Nash et al. | |
| D952,530 S | 5/2022 | Li | |
| D969,694 S | 11/2022 | Hederstierna et al. | |
| 2003/0107221 A1 | 6/2003 | Kobrehel | |
| 2004/0083678 A1 | 5/2004 | Tumlin et al. | |
| 2005/0072532 A1 | 4/2005 | Holden et al. | |
| 2006/0021290 A1 | 2/2006 | Kobrehel et al. | |
| 2006/0260203 A1 | 11/2006 | Wong et al. | |
| 2007/0245517 A1 | 10/2007 | Kiefer et al. | |
| 2009/0091154 A1 | 4/2009 | Gong | |
| 2009/0160220 A1 | 6/2009 | Elijah | |
| 2009/0250974 A1 | 10/2009 | Albert et al. | |
| 2011/0017412 A1 | 1/2011 | Macneil | |
| 2012/0073770 A1 | 3/2012 | Zheng | |
| 2014/0245556 A1 | 9/2014 | Kaminer et al. | |
| 2015/0101768 A1 | 4/2015 | Lee | |
| 2018/0357871 A1* | 12/2018 | Siminoff | G08B 13/189 |
| 2019/0061829 A1 | 2/2019 | Fleckenstein et al. | |
| 2020/0149334 A1 | 5/2020 | Lundqvist et al. | |
| 2021/0188056 A1 | 6/2021 | Dillhage | |
| 2021/0188057 A1 | 6/2021 | Dillhage | |
| 2021/0188058 A1 | 6/2021 | Dillhage | |
| 2022/0274467 A1 | 9/2022 | Meda et al. | |
| 2022/0297512 A1 | 9/2022 | Meda et al. | |

FOREIGN PATENT DOCUMENTS

| | | | |
|---|---|---|---|
| AU | 362564 S | 7/2015 | |
| AU | 362565 S | 7/2015 | |
| AU | 2014256378 A1 | 5/2016 | |
| AU | 2015201787 A1 | 10/2016 | |
| AU | 2018217330 A1 | 3/2019 | |
| AU | 202010969 S | 3/2020 | |
| AU | 202010970 S | 3/2020 | |
| AU | 202010973 S | 3/2020 | |
| AU | 2020332703 A1 | 3/2022 | |
| AU | 2020334121 A1 | 3/2022 | |
| CA | 2635065 A1 | 10/2009 | |
| CN | 114340926 A | 4/2022 | |
| CN | 216866539 U | 7/2022 | |
| CN | 216894201 U | 7/2022 | |
| CN | 216974705 U | 7/2022 | |
| DE | 4009348 A1 | 9/1991 | |
| DE | 3780499 T2 | 3/1993 | |
| DE | 19725677 A1 | 12/1998 | |
| DE | 29715579 U1 | 2/1999 | |
| DE | 29818045 U1 | 2/1999 | |
| DE | 29902888 U1 | 7/1999 | |
| DE | 29903324 U1 | 7/1999 | |
| DE | 20005246 U1 | 11/2000 | |
| DE | 20009267 U1 | 11/2001 | |
| DE | 20306085 U1 | 7/2003 | |
| DE | 10335276 A1 | 3/2005 | |
| DE | 202006001352 U1 | 4/2006 | |
| DE | 102008033417 A1 | 1/2010 | |
| DE | 502004010836 | 1/2010 | |
| DE | 102008044891 A1 | 7/2010 | |
| DE | 102009019888 B4 | 2/2015 | |
| DE | 202017106376 U1 | 12/2017 | |
| DE | 102016124327 A1 | 6/2018 | |
| DE | 102018105800 A1 | 9/2018 | |
| DE | 102017206449 A1 | 10/2018 | |
| DE | 102017214863 A1 | 10/2018 | |
| DE | 102018205680 A1 | 10/2018 | |
| DE | 102019204525 A1 | 10/2020 | |
| DE | 102019212527 A1 | 2/2021 | |
| DE | 102019212529 A1 | 2/2021 | |
| DE | 102019220488 A1 | 6/2021 | |
| DE | 102019220490 A1 | 6/2021 | |
| DE | 102019220491 A1 | 6/2021 | |
| DE | 102019205795 B4 | 3/2022 | |
| DE | 202018006765 U1 | 12/2022 | |
| DK | 1503023 T3 | 5/2010 | |
| EM | 006745642-0001 | 8/2019 | |
| EM | 006745642-0002 | 8/2019 | |
| EM | 006745642-0003 | 8/2019 | |
| EM | 006745642-0004 | 8/2019 | |
| EP | 1503023 A2 | 2/2005 | |
| EP | 1574646 A1 | 9/2005 | |
| EP | 1813750 A2 | 8/2007 | |
| EP | 2159357 A2 | 3/2010 | |
| EP | 2733301 A2 | 5/2014 | |
| EP | 3073034 A1 | 9/2016 | |
| EP | 4013633 A1 | 6/2022 | |
| EP | 4018062 A1 | 6/2022 | |
| ES | 2342165 T3 | 7/2010 | |
| FR | 2676402 A1 * | 11/1992 | ............... B60J 1/14 |
| GB | 1499831 A | 2/1978 | |
| GB | 2119846 A | 11/1983 | |
| GB | 2161201 A | 1/1986 | |
| WO | 2019093896 A2 | 5/2019 | |
| WO | WO2021032424 A1 | 2/2021 | |
| WO | WO2021032470 A1 | 2/2021 | |

OTHER PUBLICATIONS

European Patent Office, International Search Report and Written Opinion for app. No. PCT/EP2020/071352 mailed Nov. 10, 2020, 11 pages.

(56) References Cited

OTHER PUBLICATIONS

Office action DE Patent Application No. 1020192125298 mailed on Sep. 9, 2022.
EP Patent Application No. 20754689.6 titled "Device for Supporting a Frame in an Opening, a Frame With Such a Device, a Window, a Recreational Vehicle With Such a Frame or Window and Method for Supporting the Frame or the Window in the Opening" filed on Aug. 4, 2020.
CN Patent Application No. 202080059021.4 titled "Device for Supporting a Frame in an Opening, a Frame With Such a Device, a Window, a Recreational Vehicle With Such a Frame or Window and Method for Supporting the Frame or the Window in the Opening" filed on Feb. 21, 2022.
CN Patent Application No. 202080059013.X titled "Window, Recreational Vehicle With the Window and Methods for Manufacturing and Operating the Window" filed on Feb. 21, 2022.
EP Patent Application No. 20750622.1 titled "Window, Recreational Vehicle With the Window and Methods for Manufacturing and Operating the Window" filed on Jul. 29, 2020.
U.S. Appl. No. 29/867,842 titled "U.S. Appl. No. 29/867,842", filed Nov. 10, 2022.
Office action DE Patent Application No. 1020192125271 mailed on Dec. 2, 2022.
Australian Patent Application No. 202010970 titled "Extendible window for a recreational vehicle" filed on Feb. 20, 2020.
Australian Patent Application No. 202010973 titled "Extendible window for a recreational vehicle" filed on Feb. 20, 2020.
Australian Patent Application No. 202010969 titled "Extendible window for a recreational vehicle" filed on Feb. 20, 2020.
Australian Patent Application No. 2020334121 titled "I-LUX RV Window Fixation" filed on Feb. 21, 2022.
Australian Patent Application No. 2020332703 titled "I-LUX window opening and closing mechanism" filed on Feb. 21, 2022.
German Patent Application No. 1020192125298 titled "Device for Supporting a Frame in an Opening, a Frame with Such a Device, a Window, a Recreational Vehicle with Such a Frame or Window and Method for Supporting the Frame or the Window in the Opening" filed on Aug. 21, 2019.
German Patent Application No. 1020192125271 titled "Window, Recreational Vehicle with the Window and Methods for Manufacturing and Operating the Window" filed on Aug. 21, 2019.
European Union Application No. 006745642-0001-0004 titled "I-LUX Window frameless window" filed on Aug. 21, 2019.
Examination Report Issued in German Patent Application No. 1020192125298 mailed on Mar. 12, 2020.
International Search Report Issued in PCT Application No. PCT/EP2020/071912 mailed on Nov. 19, 2020.
Notice of Allowance Issued in U.S. Appl. No. 29/724,878 mailed on Sep. 21, 2021.
Notice of Allowance Issued in U.S. Appl. No. 29/724,878 mailed on Feb. 16, 2022.
Office Action Issued in German Patent Application No. 1020192125271 mailed on Oct. 14, 2019.
Office Action Issued in German Patent Application No. 1020192125271 mailed on May 26, 2020.
PCT Application No. PCT/EP2020/071912 titled "Device for Supporting a Frame in an Opening, a Frame with Such a Device, a Window, a Recreational Vehicle with Such a Frame or Window and Method for Supporting the Frame or the Window in the Opening" filed on Aug. 4, 2020.
U.S. Appl. No. 17/636,487 titled "Device for Supporting a Frame in an Opening, a Frame with Such a Device, a Window, a Recreational Vehicle with Such a Frame or Window and Method for Supporting the Frame or the Window in the Opening" filed Feb. 18, 2022.
U.S. Appl. No. 29/724,878 titled "Window" filed Feb. 20, 2020.
Australian Design Application No. 202317866 titled "Window for vehicles" filed on Nov. 27, 2023.
Australian Design Application No. 202317867 titled "Window for vehicles" filed on Nov. 27, 2023.
EU Design Application No. 015024206-0001-015024206-0002 titled "Window for vehicles" filed on Jun. 9, 2023.
Notification of Registration issued in EU Design Application No. 015024206-0001-015024206-0002 mailed on Jun. 21, 2023.
Certificate of Registration issued in EU Design Application No. 015024206-0001 mailed on Jun. 9, 2023.
Certificate of Registration issued in EU Design Application No. 015024206-0002 mailed on Jun. 9, 2023.
Office Action issued in EP Application No. 20750622.1 mailed on Jul. 4, 2023.
U.S. Appl. No. 29/919,794 titled "Window Assembly" filed Dec. 6, 2023.
Notice Of Allowance issued in U.S. Appl. No. 29/867,842 mailed on Mar. 22, 2024.
Registration Certificate issued in AU Application No. 202317866 mailed on Jan. 14, 2024.
Registration Certificate issued in AU Application No. 202317867 mailed on Jan. 14, 2024.
Non-Final Office Action issued in U.S. Appl. No. 17/636,487 mailed on Jul. 12, 2024.
Office Action issued in EP Application No. 20754689.6 mailed on May 16, 2024.
Office Action issued in CN Application No. 202080059013.X mailed on Feb. 13, 2025.

* cited by examiner

FIG. 1

(Prior Art)

WINDOW, RECREATIONAL VEHICLE WITH THE WINDOW AND METHODS FOR MANUFACTURING AND OPERATING THE WINDOW

CLAIM TO PRIORITY

This 35 U.S.C. § 371 National Stage Patent application claims priority to PCT Patent Application No. PCT/EP2020/071352, filed Jul. 29, 2020, and titled "Window, Recreational Vehicle with the Window and Methods for Manufacturing and Operating the Window" which claims priority to and benefit of German Patent Application Serial Number DE 102019212527.1 filed Aug. 21, 2019, all of which is incorporated by reference herein.

BACKGROUND

The present embodiments relate to a window, a recreational vehicle, like a motor home or a caravan, comprising the window and a method for manufacturing and for operating the window.

Figure 1:
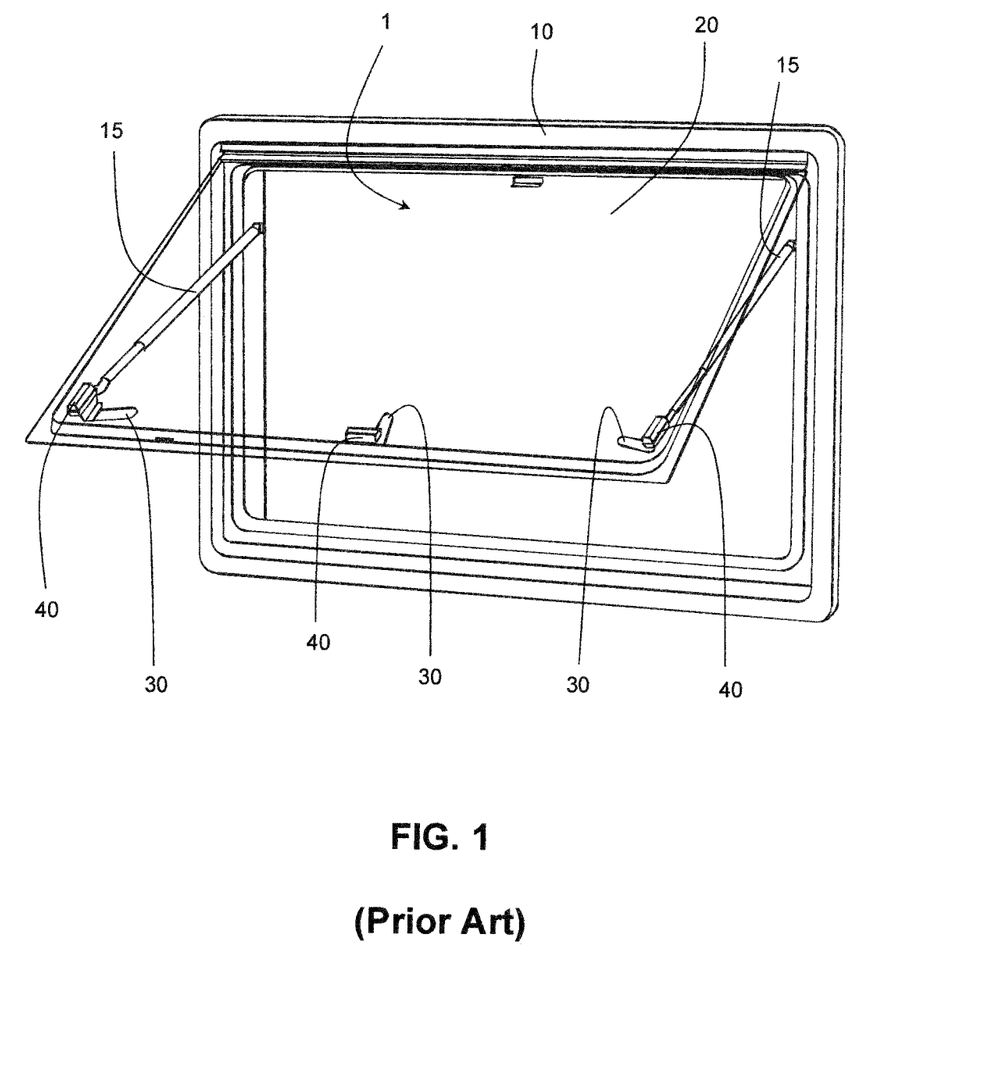
FIG. 1 is a spatial view of an example of a window according to the prior art.

As can be seen in FIG. 1, a common window 1 for a recreational vehicle such like a motor home or a caravan conventionally is provided with a frame 10. The frame 10 is supportable to a wall W via corresponding devices 80. The common window 1 is further provided with a pane 20 attached to the frame 10 in a pivotable manner such that the pane 20 is pivotable relative to the frame 10 about a pivot axis such as to be pivotable between a closed position and an opened position. The common window 1 is further provided with several (here three) actuating devices 30 mounted on the pane 20 (or on the frame 10), and several (here three) locking elements 40 configured to be movable between a released state and a locked state. In the released state the locking elements 40 permit a pivotal movement of the pane 20 between the closed position and the opened position relative to the frame 10. In the locked state the locking elements 40 prevent a pivotal movement of the pane 20 between the closed position and the opened position with respect to the frame 10. Each of the locking elements 40 is coupled to its own actuating device 30 operatively such that an operation of the actuating devices 30 causes the corresponding locking elements 40 to move between the released state and the locked state, respectively. When the actuating device 30 is in a first state, the corresponding locking element 40 is in the released state and when the actuating device 30 is in a second state, the corresponding locking element 40 is in a locked state. Here, the actuating devices 30 and the locking elements 40 are formed integrally. In the locked state, the locking elements 40 are in engagement with corresponding latching elements (not shown) to prevent a pivotal movement of the pane 20 with respect to the frame 10. The window further comprises in particular two extendable adjusters 15 coupled to the frame 10 and to the pane 20 in such a way that they support the pane 20 with respect to the frame 10, when the pane 20 is in the opened position with respect to the frame 10. The actuating devices 30, the locking devices 40 and the extendable adjusters are provided in a manner in which they are well visible in any operation state of the window.

Although such a known configuration has proven to be quite practical and reliable, there is always a demand for further improvement of the appearance and operability of such windows in view of comfort, simplicity, durability and design.

Accordingly, the task to be solved by the present embodiments is to provide a window with a configuration resulting in a simplified and more comfortable operability thereof which provides a durable solution offering finally also a clean and attractive design and overall appearance. The present embodiments further provide a corresponding recreational vehicle as well as appropriate methods for manufacturing and operating such a window.

These tasks are solved by the accompanied independent claims. Derivatives are to be found in the dependent claims.

SUMMARY

According to a first aspect of the present embodiments, a window, which in particular is adapted for use in a recreational vehicle like a motor home or a caravan, comprises a frame, a pane, which is attached to the frame so that it can pivot relative to the frame about a pivot axis between a closed position and an opened position, at least one actuating device mounted on the frame or on the pane and being movable between a first state and a second state, and at least one locking element configured to be movable between a released state and a locked state. In the released state the locking element permits a pivotal movement of the pane between the closed position and the opened position. In the locked state the locking element prevents a pivotal movement of the pane between the closed position and the opened position. Each actuating device is coupled to at least one locking element operatively in such a way that an operation of an actuating device causes a corresponding movement of the respective locking element between the released state and the locked state, such that when the actuating device is in the first state, the respective locking element is in the released state and when the actuating device is in the second state, the respective locking element is in the locked state. The frame has at least one cavity, receiving at least one actuating device and/or locking element at least partially, in particular entirely, when the actuating device is in the second state and/or when the locking element is in the locked state, respectively.

With this configuration, the provided actuating device(s) and/or locking element(s) are hidden within corresponding cavities provided in the frame when being in the second state, respectively, in the locked state, corresponding to a non-activated operation mode of the window. Such a hiding not only results in a very favorable overall appearance for the window but also in an improved protection for the hidden elements against external influenced like for example dust or solar radiation.

According to some embodiments, the window further comprises at least one, in particular two, extendable adjuster being coupled at one of its lateral ends to the frame and on the other of its lateral ends to the pane, such that the extendable adjuster supports the pane with respect to the frame when the pane is in an opened position. The frame has at least one further cavity, receiving the extendable adjuster at least partially, and in some embodiments entirely, when the pane is in the closed position with respect to the frame.

Providing two extendable adjusters results in a configuration having an improved stability without having unnecessarily much different components resulting in increased costs and susceptibility to errors of the overall configuration. Hiding also the extendable adjuster(s) in correspondingly provided further cavities results in the respective technical effects achieved for the actuating device(s) and locking element(s) as described above with regard to the above described cavity.

According to some embodiments the cavity and/or if provided the further cavity may be configured such that that the corresponding actuating device, the locking element and/or if provided the extendable adjuster substantially is not visible when the pane is in the closed state, the actuating device is in the second state and the locking element is in the locked state, in the frontal view of the window.

Further, according to some embodiments, at least one cavity may be configured to receive a locking element and may be configured such that in the closed state of the pane, and in particular also in the opened state of the pane, the corresponding locking element also is received in the respective cavity at least partially, in particular entirely, such that is substantially not visible in the frontal view of the window.

Providing the cavity as always enclosing the corresponding locking element(s) results in the above described technical effects on the respective locking element(s) for each operation state of the window.

According to some embodiments, a window, in particular a window for a recreational vehicle like a motor home or a caravan, is characterized in that the window has at least two locking elements and in that at least one actuating device is coupled via a coupling arrangement, which is provided within an elongated cavity in the frame, to the at least two locking elements operatively in such a way that an operation of the actuating device causes a corresponding movement of all of the at least two locking elements between the released state and the locked state.

With the coupling arrangement, it is possible to move at least two of the provided locking elements with only one operation of one common actuating device. Thus, there is no need to conduct for each of the locking elements an own operation for releasing and/or unlocking the same. This results in a much simplified and more comfortable operability for the window. The term "provided within the frame" means that the coupling arrangement (that means its elements) is more or less arranged in the frame, or in other words hidden within the frame. This is achieved by arranging the coupling arrangement (that means its elements) in particular within a elongated cavity provided within the frame, such that the coupling arrangement (that means its elements) substantially is not visible when the window is in the assembled and/or mounted (within a corresponding opening in the wall) configuration. Such an arrangement or hiding of the coupling arrangement not only results in an improved appearance of the overall window. Such an arrangement further results also in an appropriate protection of the coupling arrangement against external influences like for example dust or direct sunlight reducing the lifetime of the provided coupling arrangement. In particular, there is provided only one common actuating device coupled via the coupling arrangement to all of the provided locking elements such that only one operation of the actuating device results in all of the provided locking elements moving between the released state and the locked state.

The window may further comprise at least one latching element provided on the pane. The at least one latching element may be configured such that in the closed position of the pane, the at least one latching element can be brought into engagement with at least one of the locking elements by a movement of the respective locking element(s). When being engaged with the respective locking element(s), the at least one latching element prevents a pivotal movement of the pane out of the closed position. The at least one latching element further is configured such that in the closed position of the pane the at least one latching element can be disengaged from the respective locking element(s) by a reverse movement of the respective locking element(s). When being disengaged from the respective locking element(s), the at least one latching element permits a pivotal movement of the pane (that means it does no more prevent such a movement).

With the at least one provided latching element, the pane can be locked in the closed position preventing an unintentional pivotal movement of the pane from the closed position into the opened position. Thus, it is possible to improve the control over the operation state of the window resulting in a reduced likeliness of damage to the window due to uncontrolled changes in the operation state.

According to some embodiments, the at least one latching element may have a projection and/or a receiving region, and/or the respective locking element(s) may have a corresponding receiving region and/or projection. The at least one latching element and the respective locking element(s) can be engaged with each other by engagement of the provided projections with the corresponding receiving regions.

This implementation for the provided latching element(s) and locking element(s) is a quite simple but reliable way to achieve the above described functionality.

Further, the at least one latching element is formed integrally with the pane. Alternatively, the at least one latching element is provided as separate components fixed to the pane.

Forming the at least one latching element integrally with the pane allows to reduce the number of steps which are necessary to assemble the window. Moreover, forming the at least one latching element integrally with the pane allows to reduce the number of separate components for the window. Hence, this results in a facilitated assembling process and thus reduced effort and costs. Providing the at least one latching element as separate component fixed to the pane results in a higher adaptability of the window, as various different latching elements could be coupled to the pane. In addition, in the event of material fatigue of some of the provided latching elements, the respective latching elements could be replaced easily without the need of replacing the whole pane.

According to some embodiments the at least one locking element is arranged on the frame and may be provided rotatably with respect to the frame such that the at least one locking element is pivotable between a first orientation of the at least two locking elements relative to the frame, depicting the released state for the at least one locking element, and a second orientation different from the first orientation relative to the frame, depicting the locked state for the at least one locking element.

This results in the implementation of a rotational movability of the locking element(s) to move between the released state and the locked state, wherein this rotational movability results in a very smart and space saving overall configuration.

Alternatively, according to some embodiments, the at least one locking element is arranged on the frame and are provided movably relative to the frame to be movable along the frame, so that the at least one locking element is movable between a first position relative to the frame, depicting the released state for the at least one locking element, and a second position relative to the frame different from the first position, depicting the locked state for the at least one locking element.

This results in the implementation of a transversal movability of the locking element between the released state and the locked state, wherein this transversal movability results in a very simple and thus reliable configuration.

Of course, also a combination of the rotational movability with the transversal movability could be implemented. Such an implementation would result in a high adaptability for the moving path of the locking elements and thus would allow highly specialized configurations.

Further, according to some embodiments, the at least one locking element is arranged on at least one carriage. The at least one carriage is attached to the frame to be movably along the frame.

The at least on provided carriage in particular is engaged with at least one corresponding guiding rail, along which the at least one carriage can be moved in a more or less free manner. Providing such carriages depict a quite easy but reliable possibility for implementing the above described transverse movability. It is noted that the at least one carriage has not to be provided as component separate from the corresponding locking element(s) but also could be formed integrally with them.

Further, according to some embodiments, each locking element may have its own carriage, wherein each carriage is connected to at least one other carriage via the coupling arrangement in such a way that the coupled carriages can only be moved together along the frame.

Providing several carriages, each for one of the locking elements, results in a high adaptability for the overall system, as the concrete positioning of the various locking elements is not directly limited by the configuration of the provided carriages, as it would be the case if several locking elements would be arranged on one common carriage. However, this configuration with separate carriages for each, or possibly also for some, of the locking elements results in an increased number of degrees of freedom for adaption. An implementation with a reduced number of separate carriages results in a simplified and thus less error-prone configuration. In the configuration with more than only one carriage, the coupling arrangement couples the movement of the actuating device with the movement of the locking elements (and thus also the movement between the provided locking elements) via the carriages.

Further, according to some embodiments, the coupling arrangement is formed as one integral coupling element. Alternatively, the coupling arrangement comprises a plurality of separate coupling elements coupled to each other.

Providing the coupling arrangement as one integrally formed coupling element depicts, due to the decreased number of different components for the window, in a simplified and thus more reliable configuration. However, the alternative solution with several coupling elements results in a highly adaptable configuration, allowing highly space saving and/or complex implementations.

Further, according to some embodiments, the coupling arrangement or at least one of the coupling elements of the coupling arrangement is designed to be substantially stiff along its longitudinal axis with respect to compressive and tensile forces.

Providing the coupling arrangement and/or its coupling elements in a substantially stiff configuration along at least one direction depicts a very easy and reliable possibility to couple the movement of the actuating device with the movement of the provided fixing elements. However, also other configurations with highly ductile and/or elastic materials for the coupling arrange and/or at least some of its coupling elements can be provided. Although such configurations would allow an increased adaptability of the overall system, they often show an increased error-proneness.

According to some embodiments, the actuating device has a handle portion and a coupling portion and is mounted to the pane in a rotatable manner to be rotatable about an axis of rotation extending perpendicular to the plane of expansion of the pane. The actuating device, and in particular its coupling portion, is pivotable between a closed orientation and an opened orientation about the respective axis of rotation. The coupling portion of the actuating device is coupled to the coupling arrangement such that a rotation of the actuating device between the opened orientation and the closed orientation results in the at least two locking elements moving between the released state and the locked state, correspondingly.

Here, the closed orientation corresponds to the second state of the actuating device and the opened orientation corresponds to the first state of the actuating device. This configuration depicts a quite simple and thus reliable implementation for a hand operated actuating device.

According to some embodiments, the actuating device is mounted on the pane and has a locking portion which, when the pane is in the closed position, can be engaged with a counterpart arranged on the frame in such a way that a pivotal movement of the pane from the closed position into the opened position is prevented.

Such a locking portion can serve as one of the at least two provided locking elements. This results in a reduced number of distinct components for the window and in a simplified structural configuration being less prone to errors. Although, such a configuration shows the advantage that the actuating device also could serve as handle for opening the window, the actuating device could be provided on the frame and the counterpart on the pane.

According to some embodiments, the frame and the pane are substantially rectangular, in particular square, and the actuating device and/or the locking elements are arranged on a crossbar of the frame or on a side of the pane opposite the pivot axis.

With this configuration, the occurrence of unwanted shear forces harming a hinge coupling the pane to the frame can be avoided. Thus, due to the leverage effect achieved therewith, opening, closing and/or locking of the window is facilitated or stabilized, respectively, in a substantial manner.

The frame and the pane are substantially rectangular, in particular square, and the actuating device is arranged on a crossbar of the frame or on a side of the pane opposite the pivot axis. Moreover, at least one of the locking elements is arranged on each side cross bar of the frame or on each side of the pane extending transversely to the pivot axis.

In particular, both on the crossbar of the frame or on the side of the pane opposite the pivot axis and on the side crossbars corresponding locking elements are provided. Such a configuration results due to the uniform distribution of the various components about the frame and/or the pane in a highly stable structural configuration for such a window.

The frame may be made of metal material, for example Aluminum, and/or the pane is fixed to the frame via at least one hinge made of metal, for example Aluminum. However, also other materials, like plastic material may be used.

Aluminum is a very robust and lightweight material and therefore very suitable for window components.

According to some embodiments, the frame may have a receiving cutout for receiving a sensor arrangement and/or a sensor arrangement particularly provided within a corresponding receiving cutout. In particular, the sensor arrangement is designed to determine and output information about the current position of the pane relative to the frame.

Instead of a sensor arrangement, also other components like an electrically operated actuator for opening and closing the window or other functional components like sunshields can be provided. With a sensor arrangement as described above, it is possible to determine whether the window is opened or closed on distance. This can for example be determined by a corresponding remote control or a smartphone equipped with a corresponding application, being wirelessly connected to the sensor arrangement and thus to check the security status of the window and thus of the whole recreational vehicle. Alternatively or in addition, with a correspondingly provided actuator, one could operate the window via remote control or even by using the smart phone as well.

According to another aspect, a recreational vehicle, in particular a motor home or a caravan, comprises at least one of the windows according to the present invention as described above.

Such a recreational vehicle benefits from the plurality of advantages of the window.

According to a further aspect of the present invention, a method for manufacturing a window according to the present invention, in particular for manufacturing one of the windows described above, comprises the step of providing a window comprising a frame, a pane attached to the frame pivotally about a pivot axis between a closed position and an opened position with respect to the frame, an actuating device mounted on the frame or on the pane, and at least one locking elements. The locking element is coupled to the frame such that they are movable between a released state, in which the locking element permits a pivotal movement of the pane between the closed position and the opened position, and a locked state, in which the at least two locking elements prevent a pivotal movement of the pane between the closed position and the opened position. Each actuating device is coupled to at least one locking element operatively in such a way that an operation of an actuating device causes a corresponding movement of the respective locking element between the released state and the locked state, such that when the actuating device is in the first state, the respective locking element is in the released state and when the actuating device is in the second state, the respective locking element is in the locked state The method further comprises the step of providing at least one cavity, receiving at least one actuating device and/or locking element at least partially, in particular entirely, when the actuating device is in the second state and/or when the locking element is in the locked state, respectively, in the frame.

With this method, it is possible to achieve the above described window and its technical effect.

According to some embodiments, the method further comprise the steps of coupling at least one, in particular two, extendable adjuster at one of its lateral ends to the frame and on the other of its lateral ends to the pane, such that the extendable adjuster supports the pane with respect to the frame when the pane is in an opened position, and providing at least one further cavity, receiving the extendable adjuster at least partially, in particular entirely, when the pane is in the closed position with respect to the frame, in the frame.

This method results in an implementation of a window according to the present embodiments described above.

According to the present embodiments, the method further comprises providing the step of providing at least two of the above described locking elements and arranging a coupling arrangement within an elongated cavity provided in the frame in such a way that the coupling arrangement is substantially invisible when the window is in the assembled/mounted state. Finally, the method comprises the step of coupling the coupling arrangement to the at least two locking elements and the actuating device such that an operation of the actuating device causes a corresponding movement of the at least two locking elements between the released state and the locked state.

With this method according to some embodiments, it is possible to manufacture the above described windows in a simple and time saving manner. Hence, this offers to achieve the therewith related advantages.

According to a further aspect of the present embodiments, a method for operating a window, in particular for operating one of the above described windows, comprises simultaneously releasing and/or locking at least two locking elements by operating, in particular by manual actuation, an (that means one single) actuating device coupled to two locking elements.

This method depicts an example operation an embodiment of a window.

BRIEF DESCRIPTION OF THE DRAWINGS

A more complete appreciation of the invention and many of the attendant advantages thereof will be readily obtained as the same becomes better understood by reference to the following detailed description in connection with the accompanying drawings, wherein.

DETAILED DESCRIPTION

The embodiments will now be described with reference to the accompanying drawings FIG. 2 to FIG. 5, identical reference numerals designate corresponding or identical elements throughout the various drawings.

Figure 2:
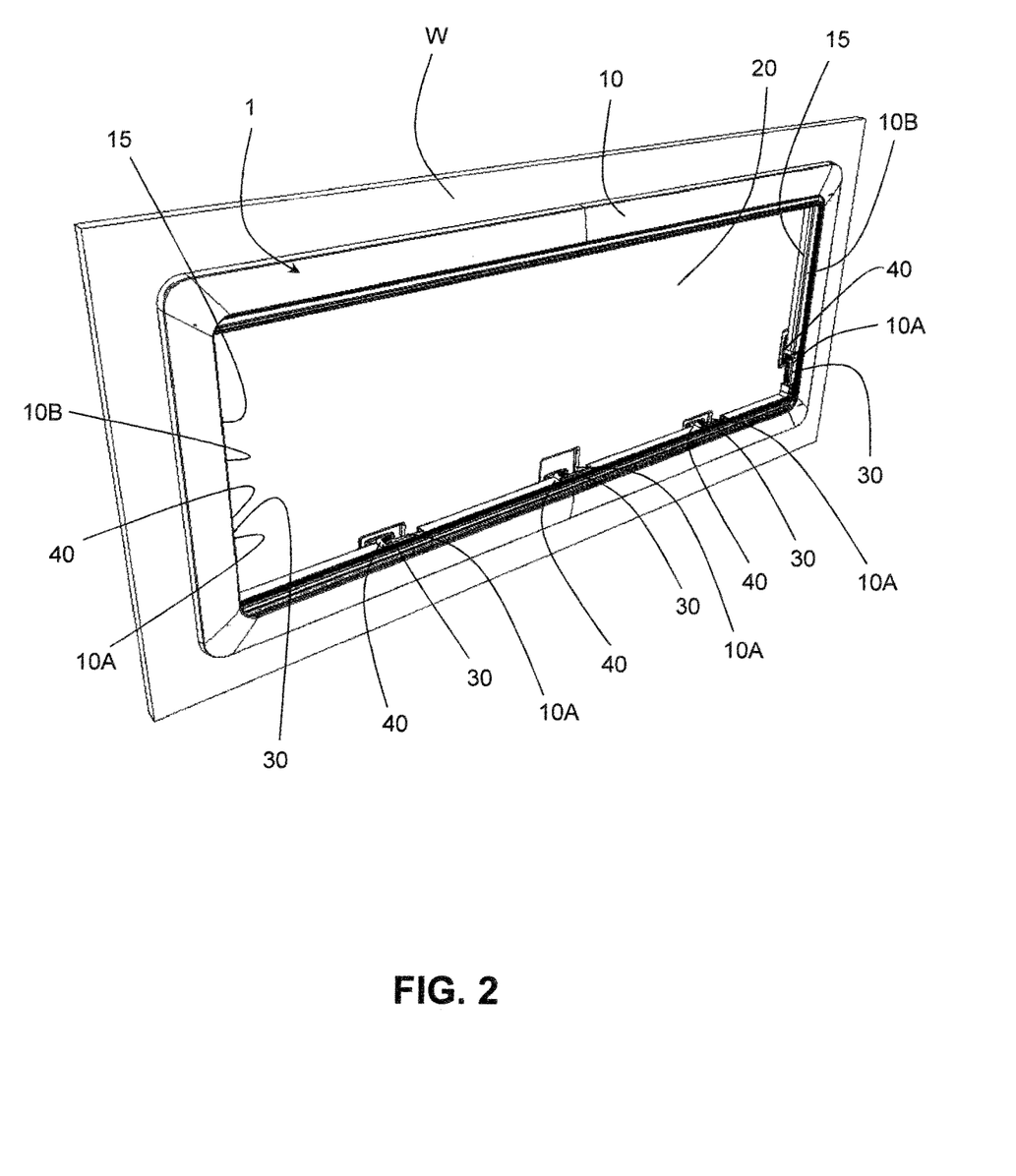
FIG. 2 is a spatial view of a window according to an exemplary embodiment.
Figure 3:
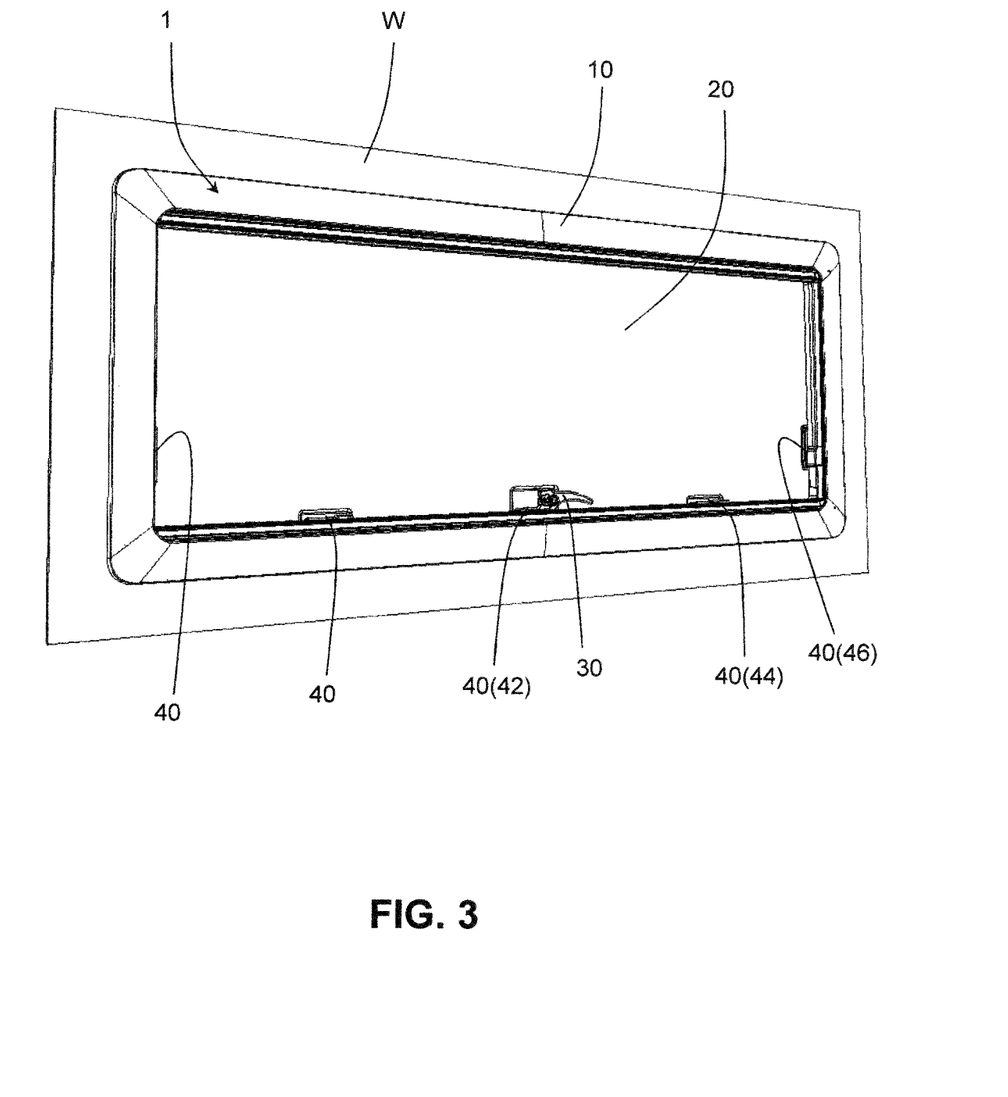
FIG. 3 is a spatial view of a window according to a preferred exemplary embodiment.

In FIG. 2, an embodiment of a window 1 according to the present invention is illustrated. The window 1 is supported via corresponding devices 80 (see FIGS. 3 and 4) within an opening in a wall W. Similar like the window 1 shown in FIG. 1 and according to the state of the art, the window 1 according to the present invention comprises a frame 10 to which a pane 20 is coupled in a pivotable manner to be pivotable about a pivot axis between a closed position and an opened position. In the illustrated embodiment, the pane 20 is pivotable here about a pivot axis along the upper crossbar of the frame 10 between the closed position and the opened position. To be able to lock the pane 20 with respect to the frame 10 in the closed position, the window 1 comprises several locking elements 40. In the illustrated embodiment the window 1 comprises a number of five locking elements 40. Although in the illustrated embodiment, five locking elements 40 are provided, also less, like for example only two, or even more, like for example ten, locking elements 40 could be provided. Here, for each provided locking element 40, a separate actuating device 30 mounted on the pane 20 is provided. The actuating devices 30 also could be mounted on the frame 10. The actuating devices 30 each are coupled to its corresponding locking element 40 operatively in such a way that an operation of the actuating devices 30 results in a movement of the provided locking elements 40 between a released state and a locked state. In other words, when the actuating devices 30 are in a first state, the respective locking elements 40 are in the released state and when the actuating devices 30 are in the second state, the respective locking elements 40 are in the locked state. The frame 10 is further provided with at least one cavity 10A, here one cavity 10A for each pair of actuating devices 30 and locking element 40 configured such that when the actuating devices 30 is in the second state and/or when the locking elements 40 are in the locked state, respectively, these components are received in the corresponding cavities 10A. In particular, the are received in the cavities 10A in such a way that they are hidden within the frame 10 to be not visible in the frontal view of the window.

Similar to the window 1 shown in FIG. 1, the window according to the exemplary embodiment of the present invention illustrated in FIG. 2 has two extendable adjusters 15 provided in the known manner to the remaining components of the window (see above description). The frame 10 has two further cavities 10B, wherein these further cavities 10B are configured to receive the extendable adjusters 15 (one further cavity for each extendable adjuster) to hide them in the frame 10 when the pane 20 is in the closed position with respect to the frame.

In the further drawings (FIG. 3 to FIG. 5), an exemplary embodiment of a window is illustrated. The configuration of this window is quite similar to the one described with reference to FIG. 2.

However, the window 1 according to the instant embodiment, comprises here in particular one single actuating device 30 mounted on the pane 20. The actuating device 30 also could be mounted on the frame 10. The actuating device 30 is coupled via a corresponding coupling arrangement (not shown) to the locking elements 40 operatively in such a way that an operation of the actuating device 30 results in a movement of the provided locking elements 40 between a released state and a locked state. The coupling arrangement is provided in such a manner that it (in principle) cannot be seen in the assemble/mounted state of the window 1 (see FIG. 3). For this, the corresponding coupling elements of the coupling arrangement are provided within appropriate elongated cavities 10C (or one cavity) within the frame 10. In the locked state, the locking elements 40 prevent a pivotal movement of the pane 20 with respect to the frame between the closed position and the opened position, while in the released state. Here, the locking elements 40 are fully received (i.e. hidden) within correspondingly provided cavities 10A for every operation state of the window.

In the following, the specific and detailed structure and function of the window 1 as well as of its components and in particular the specific and detailed structure and the functional interaction between the actuating device 30, the locking elements 40 and the coupling arrangement are described in more detail with respect to FIG. 4 and FIG. 5.

Figure 4:
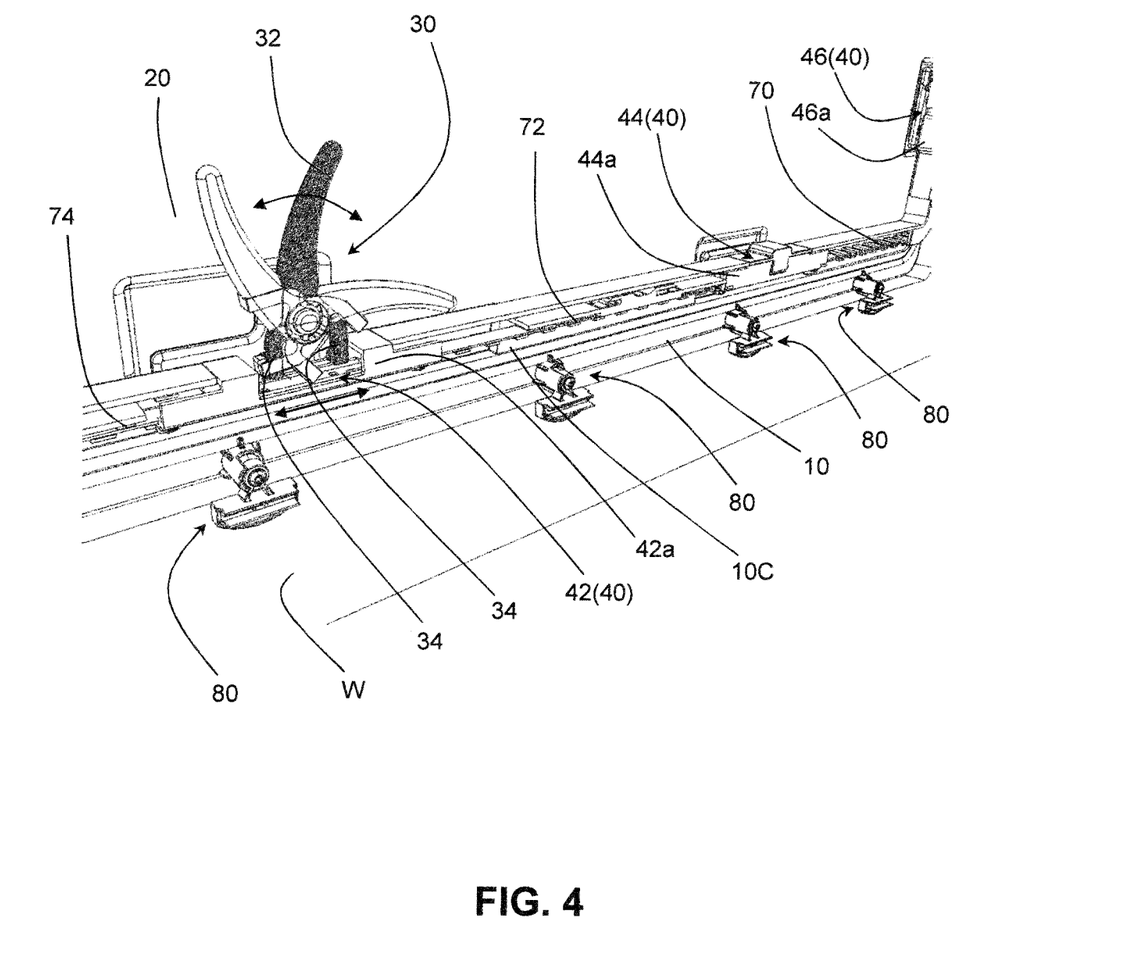
FIG. 4 is a sectional spatial view of the window of FIG. 3 in which the inner frame is detached, thus illustrating several different orientations of the actuating device.
Figure 5:
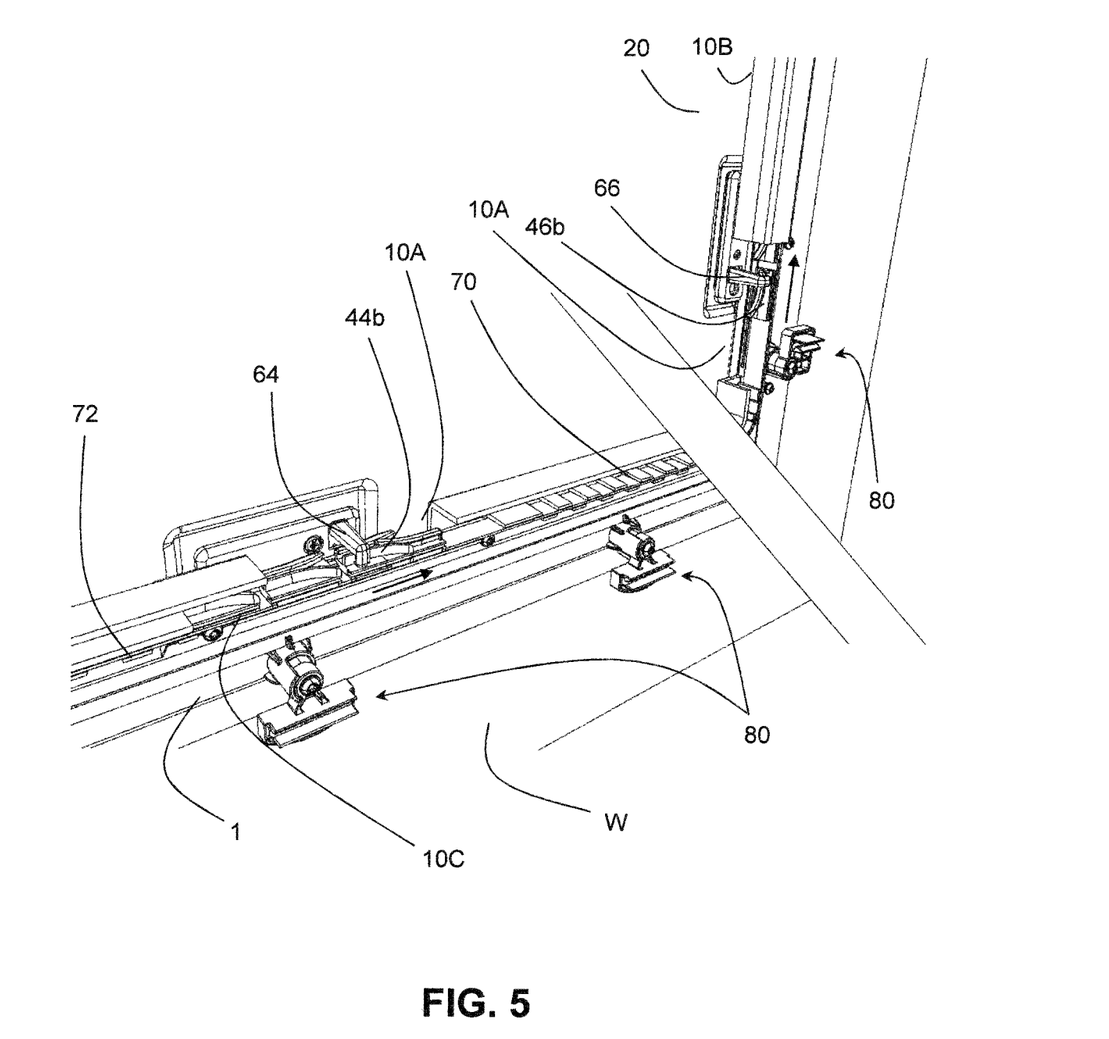
FIG. 5 is a further spatial view of the window of FIG. 3 and FIG. 4 in which further components of the window are detached.

As can be seen in FIG. 4, the actuating device 30 is coupled to the pane 20 in a rotatable manner. The actuating device 30 in the present embodiment has a handle portion 32 and here in particular two coupling portions 34. The window 1 comprises a first locking element 42, a second locking element 44 and a third locking element 46, the locking elements 42, 44, 46 being attached to the frame 10 via corresponding carriages 42a, 44a, 46a. The carriages 42a, 44a, 46a and thus the corresponding locking elements 42, 44, 46 are configured to be movable along the frame 10 between a released state and a locked state (see for example the arrow for the first locking element). In the scope of the present embodiments the phrase "along the frame" is to be understood in that the locking elements 42, 44, 46 can move along the longitudinal axis of the corresponding crossbar of the frame 10, on which the respective locking element 40 is provided.

On the pane 20, several latching elements 64 and 66 with protrusions are provided. Here, the protrusions are formed in a hook like manner (see FIG. 5). Each of the locking elements 42, 44, 46 has at least one receiving region 44b, 46b configured to be engaged and disengaged with the corresponding latching elements 64 and 66 by movement of the locking elements 44 and 46 between their released state and the locked state. In FIG. 5, on the right side, the third locking element 46 is illustrated in the locked state. Here the corresponding latching element 66 is fully engaged with the receiving region 46b of the locking element 46. Thus, the pane 20 cannot be pivoted from the closed position to the opened position with respect to the frame 10. In FIG. 5, on the left side, the second locking element 44 is illustrated in an intermediate state, in which the corresponding latching element 64 is only partially engaged with the receiving region 44b. If the second locking element 44 is shifted further to the right of FIG. 5 (see the corresponding arrow), the latching element 64 will disengage from the locking element 44 (that means from the receiving region 44b) and thus would permit a pivotal movement of the pane 20 with respect to the frame 10. The same holds for the third locking element 46. But here the locking element 46 will move along the frame 10 in an upwards direction in FIG. 5 (see the corresponding arrow).

The second locking element 44 and the third locking element 46 are coupled via a first coupling element 70 forming a part of the coupling arrangement to each other such. Hence, the second locking element 44 and the third locking element 46 always move together between the released state and the locked state. Here, the first coupling element 70 is provided as belt member being guided along the corner of the frame 10 by a corresponding rail. The first coupling element 70 is stiff along its longitudinal axis (that means along the frame 10) but elastically deformable perpendicular thereto such that it can be led around the corner of the frame 10 by the rail. The second locking element 44 is coupled via a second coupling element 72 to the first locking element 72. In particular, the respective locking elements 42, 44, 46 are coupled to each over via their carriages 42a, 44a, 46a being coupled to the respective coupling elements 70 and 72. The locking elements 42, 44, 46 are coupled to the further locking elements (not illustrated in FIGS. 3 and 4) via a third coupling element 74 and further coupling elements (not shown) in a similar manner as illustrated in FIG. 5. Here, the various coupling elements 70, 72 and 74 are provided as belt elements depicting sections of one common coupling belt forming the coupling arrangement. Thus, via the coupling arrangement, the movement of all of the carriages and thus of all of the locking elements 40 is coupled to each other such that the locking elements 40 only can be moved between the released state and the locked state together.

To operate the locking elements 40, the actuating device 30 is coupled with its coupling portions 34 to the first locking element 42 (in particular with therein provided openings) in such a way that a pivotal movement of the actuating device 30 results in a transverse movement of the first locking element 42. Thus, due to the coupling arrangement (that means due to the coupling elements 70, 72, 74 etc.) the pivotal movement of the actuating device 30 results in a movement of all of the provided locking elements 40 along the frame 10 between the released state and the locked state.

According to some embodiments, it is possible to move all the locking elements 40 by the operation of the one single actuating device 30 between the released and the locked state. Thus, it is possible to release or lock the pane 20 from the frame 10 (that means its pivotal movement) via one single operation.

This results a facilitated and comfortable functionality for the window 1 as compared to known configurations in which for each locking element 40 a specific single actuating device 30 had to be operated (see FIG. 1).

According to some embodiments, the provided latching elements 44b, 46b, which of course also can be replaced by otherwise designed functional elements implementing the same or similar function, are provided as separate components fixed to the pane 20 via corresponding screws. However, also configurations in which the latching elements 44b, 46b are provided integrally with the pane 20 are possible within the scope of the present invention.

Although, in some embodiments, the locking elements 40 are configured to be movable along the frame 10 in a transversal manner (that means along the respective crossbar of the frame 10), they also can be coupled to the frame 10 in such a way that they can be rotated between the released sate and the locked state. Of course, in this case also the specific implementation of the coupling arrangement would have to be adapted. But this lies within the abilities of a skilled artisan and thus is not to be described in more detail here.

Instead of providing each locking element 40 on its own carriage 44b, 46b, also several locking elements 40 can be placed on one common carriage. Thus, this common carriage will not only allow the corresponding movement of the locking elements 40 but will also act as coupling element between the corresponding locking elements 40. In principle, such a configuration is possible for locking elements 40 provided on the same cross bar of the frame 10 (or with a elastically deformable carriage).

In the illustrated embodiment, the actuating device 30 is coupled directly to the first locking element 42. Thus, its rotational movement is transferred into a transverse movement of the first locking element 42. This configuration is quite space saving. However, the actuating device 30 also can be coupled to each of the provided locking elements 40 (or just any one of the other locking elements 40) indirectly via one or more coupling elements of the coupling arrangement.

Moreover, the coupling arrangement can be provided as substantially one integrally formed element, like in the form of the coupling belt with its belt elements. Or, the coupling arrangement can be provided as several coupling elements, the coupling elements being formed identically with each other or differently from each other). Also, the specific implementation of the various coupling elements can be adapted along with corresponding adaptions of the window 1. Such adaptions are within the abilities of a skilled artisan and thus not have to be discussed here in detail.

Although not illustrated here explicitly, the actuating device 30 can be provided with a locking portion configured to be engaged with a corresponding counter part on the frame 10. Thus, the pivotal movement of the pane 20 with respect to the frame 10 is prevented also by the actuating device 30 itself (in addition to the locking elements).

The window 1, and thus its pane 20 and/or its frame 10 can have a rectangular shape, and in particular a square shape, as illustrated. But also various other shapes lay within the scope of the present invention. When a rectangular shape is implemented, the actuating device 30 as well as the locking elements 40 preferably are well distributed about the various crossbars of the frame 10 or the various sides of the pane 20, about which the pane 20 cannot be rotated with respect to the frame 10 (see also FIG. 3). Such implementations result in a highly reliable locking for the pane 20 against a pivotal movement thereof with respect to the frame 10.

Here, the frame 10 as well as a hinge, via which the pane 20 is coupled to the frame 10, are made of Aluminum. In general, Aluminum is a lightweight but highly resistive material. However, also other materials can be suitable.

Of course, the window 1 can be provided with further functional elements. For example, a sensor arrangement can be provided in a corresponding receiving cutout. Such a sensor arrangement for example could be configured to determine and forward information about a current position of the pane 20 with respect to the frame 10 (that means whether the window 1 is opened or closed). In addition or alternatively, an actuator can be provided, wherein the actuator is configured to move the locking elements 40 between their released and locked state or to open as well as to close the window 1 via remote control.

The concrete implementation of the devices 80 supporting the frame 10 to the wall W is not described here in detail. But the devices 80 are configured to be moved between one position in which the frame 10 is supported to the wall W and another position in which the frame 10 is released from the wall W via one operation, resulting in a configuration being configured to be supported and/or released from the wall W in an easy and comfortable manner.

Within this disclosure always when there is given a reference to at least one/at least two components having a specific feature/implementation, not necessarily all of the corresponding components have to be provided with this specific feature/implementation. Also, only several (or even only one) of the corresponding components can be provide with the corresponding feature/implementation as long as this does not contradict the therewith achieved effect of overall configuration according to the present invention.

REFERENCE NUMERALS 1 window
10 frame
10A cavity
10B further cavity
10C elongated cavity
15 extendable adjuster
20 pane
30 actuating device
32 handle portion
34 coupling portion
40 locking elements
42 first locking element
42a first carriage
44 second locking element
44a second carriage
44b second receiving region
46 third locking element
46a third carriage
46b third receiving region
64 second latching element
66 third latching element
70 first coupling element 72 second coupling element
74 third coupling element
76 fourth coupling element
80 device for supporting the window to the wall
W wall

The invention claimed is:

1. A window for a recreational vehicle, comprising:
a frame,
a pane, which is attached to the frame so that said pane can pivot relative to the frame about a pivot axis between a closed position and an opened position, wherein the pane is larger than an opening defined by said frame such that from an outside view, pane covers said frame,
at least one actuating device mounted on the pane and being movable between a first state and a second state,
at least two locking elements configured to be movable between a released state and a locked state, one of said at least two locking elements disposed along a horizontal portion of said frame and a second of said at least two locking elements disposed along a vertical portion of said frame,
wherein in the released state the at least two locking elements permit a pivotal movement of the pane between the closed position and the opened position, and wherein in the locked state the at least two locking elements prevent the pivotal movement of the pane between the closed position and the opened position,
wherein the frame has at least one cavity corresponding to each of said at least one actuating device and said at least two locking elements, each said at least one cavity at least partially receiving each of the at least one actuating device and the locking element when the at least one actuating device is in the second state and the locking element is in the locked state so that each of said at least one actuating device and said at least two locking elements are hidden within each said at least one cavity,
at least one extendable adjuster comprising two lateral ends, one of the two lateral ends of the at least one extendable adjuster coupled to the frame and the other of the two lateral ends of the at least one extendable adjuster coupled to the pane, such that the at least one extendable adjuster supports the pane with respect to the frame when the pane is in the opened position,
wherein the frame has at least one further cavity, receiving the at least one extendable adjuster at least partially when the pane is in the closed position with respect to the frame;
wherein the at least one cavity is configured to receive and hide the at least one actuating device, the locking element when the at least one actuating device is in the second state and the locking element is in the locked state, and said at least one further cavity is configured to receive and hide the at least one extendable adjusters when the pane is in the closed position, from in a frontal view of the window;
wall support devices which are connected to the frame and engage a wall, said wall support devices having a first position to retain the frame relative to the wall and a second position to release the frame relative to the wall.

2. The window of claim 1, wherein the at least one cavity is configured to receive the at least two locking elements such that in the closed position of the pane, and also in the opened position of the pane, the at least two locking elements also are received in the at least one cavity at least partially such that the locking elements are substantially not visible in the frontal view of the window.

3. The window of claim 1, wherein the at least one actuating device is coupled via a coupling arrangement arranged within an elongated cavity in the frame to the at least two locking elements operatively in such a way that the operation of the at least one actuating device causes a corresponding movement of all of the at least two locking elements between the released state and the locked state.

4. The window of claim 1, further comprising at least one latching element provided on the pane, wherein the at least one latching element is configured such that in the closed position of the pane the at least one latching element can be brought into engagement with the at least two locking elements by a movement of the at least two locking elements, and to prevent the pivotal movement of the pane out of the closed position when being engaged with the at least two locking elements, and
wherein the at least one latching element further is configured such that in the closed position of the pane the at least one latching element can be disengaged from the at least two locking elements by a reverse movement of the at least two locking elements and to permit the pivotal movement of the pane out of the closed position when being disengaged from the respective locking elements.

5. The window of claim 4, wherein the at least one latching element has one of a projection or a receiving region, and each of the at least two locking elements have a corresponding receiving region or projection, such that the at least one latching element and each of the at least two locking elements can be engaged with each other by engagement of the provided projections with the corresponding receiving regions.

6. The window of claim 4, wherein the at least one latching element is formed integrally with the pane or the at least one latching element is provided as separate components fixed to the pane.

7. The window of claim 1, wherein the at least two locking elements are arranged on the frame and are provided rotatably with respect to the frame such that the at least two locking elements are pivotable between a first orientation of the at least two locking elements relative to the frame, depicting the released state for the at least two locking elements, and a second orientation different from the first orientation relative to the frame, depicting the locked state for the at least two locking elements.

8. The window of claim 1, wherein the at least two locking elements are arranged on the frame and is provided movably relative to the frame along the frame, so that the locking element is movable between a first position relative to the frame, depicting the released state for the at least two locking elements, and a second position relative to the frame different from the first position, depicting the locked state for the locking element.

9. The window of claim 8, wherein the at least two locking elements are arranged on at least one carriage, the at least one carriage is attached to the frame movably along the frame.

10. The window of claim 3, wherein each of the at least two locking elements has its own carriage, wherein each said carriage is connected to at least one other carriage via the coupling arrangement in such a way that the coupled carriages can only be moved together along the frame.

11. The window of claim 3, wherein the coupling arrangement is formed as one integral coupling element or the coupling arrangement comprises a plurality of separate coupling elements coupled to each other.

12. The window of claim 3, wherein the coupling arrangement or at least one coupling element of the coupling arrangement is designed to be substantially stiff along its longitudinal axis with respect to compressive and tensile forces.

13. The window of claim 3, wherein the at least one actuating device has a handle portion and a coupling portion and is mounted rotatably about an axis of rotation extending perpendicular to a plane of expansion of the pane, to the pane, such that the at least one actuating device is pivotable between a closed orientation and an opened orientation about the axis of rotation, and
   wherein the coupling portion of the at least one actuating device is coupled to the coupling arrangement such that a rotation of the at least one actuating device between the opened orientation and the closed orientation results in the at least two locking elements moving correspondingly between the released state and the locked state.

14. The window of claim 1, wherein the at least one actuating device is mounted on the pane has a locking portion which, when the pane is in the closed position, can be engaged with a counterpart arranged on the frame in such a way that the pivotal movement of the pane from the closed position into the opened position is prevented.

15. The window of claim 1, wherein the frame and the pane are substantially rectangular and the at least one actuating device or the at least two locking elements are arranged on a crossbar of the frame or on a side of the pane opposite the pivot axis.

16. The window of claim 1, wherein the frame and the pane are substantially rectangular and the at least one actuating device is arranged on a crossbar of the frame or on a side of the pane opposite a location of the pivot axis, and at least one of the at least two locking elements are arranged on each side cross bar of the frame or on each side of the pane extending transversely to the pivot axis.

17. The window of claim 1, wherein the frame is made of Aluminum and the pane is fixed to the frame via at least one hinge made of Aluminum.

18. The window of claim 1, wherein the frame has a receiving cutout that receives a sensor arrangement, wherein the sensor arrangement determines and outputs information about a current position of the pane relative to the frame.

19. A method for manufacturing a window, comprising the steps of:
   providing said window comprising a frame, a pane attached to the frame pivotally to move about a pivot axis between a closed position and an opened position with respect to the frame, an actuating device mounted on the pane, and at least two locking elements,
   positioning the frame in a wall and moving wall support devices to a position to support the frame in the wall;
   coupling the at least two locking elements to the frame such that said pane is movable between a released state, in which the at least two locking elements permit a pivotal movement of the pane between the closed position and the opened position, and a locked state, in which the at least two locking elements prevent the pivotal movement of the pane between the closed position and the opened position,
   providing at least one cavity, at least partially receiving each of at least one actuating device and the at least two locking elements when the actuating device is in a second state and the at least two locking elements are in the locked state, in the frame, wherein each of said actuating device and said at least two locking elements are received by and hidden within the corresponding cavities when in said second state and said locked state,
   providing at least one extendable adjuster comprising two lateral ends;
   coupling of the two lateral ends of the at least one extendable adjuster to the frame and the other of said two lateral ends of the at least one extendable adjuster to the pane, such that the at least one extendable adjuster supports the pane with respect to the frame when the pane is in the opened position, and
   providing at least one further cavity, receiving in the frame the at least one extendable adjuster at least partially when the pane is in the closed position with respect to the frame.

20. The method according to claim 19, further comprising the steps of:
   arranging a coupling arrangement within an elongated cavity provided in the frame in such a way that the coupling arrangement is substantially invisible when the window is in an assembled or mounted state, and
   coupling the coupling arrangement to the at least two locking elements and the actuating device such that the operation of the actuating device causes a corresponding movement all of the at least two locking elements between the released state and the locked state.

21. The method according to claim 19, further comprising the step:
   simultaneously releasing or locking the at least two locking elements by operating by manual actuation, the actuating device coupled to the at least two locking elements.

* * * * *